(12) United States Patent
Won et al.

(10) Patent No.: US 11,450,872 B2
(45) Date of Patent: Sep. 20, 2022

(54) FUEL CELL SYSTEM FOR VEHICLE

(71) Applicant: HYUNDAI MOBIS CO., LTD., Seoul (KR)

(72) Inventors: Jong Bo Won, Yongin-si (KR); Sung Kyung Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 180 days.

(21) Appl. No.: 17/027,514

(22) Filed: Sep. 21, 2020

(65) Prior Publication Data
US 2021/0391588 A1 Dec. 16, 2021

(30) Foreign Application Priority Data
Jun. 16, 2020 (KR) .................. 10-2020-0073074

(51) Int. Cl.
*H01M 8/04* (2016.01)
*H01M 8/04746* (2016.01)
*H02M 3/335* (2006.01)

(52) U.S. Cl.
CPC ... *H01M 8/04768* (2013.01); *H02M 3/33584* (2013.01); *H01M 2250/20* (2013.01)

(58) Field of Classification Search
CPC ......... H01M 8/04768; H01M 2250/20; H02M 3/33584
USPC ....................................................... 429/428
See application file for complete search history.

(56) References Cited

U.S. PATENT DOCUMENTS

| | | | |
|---|---|---|---|
| 5,537,956 A | 7/1996 | Rennfeld et al. | |
| 7,389,840 B2 | 6/2008 | Makuta et al. | |
| 10,411,275 B2 | 9/2019 | Kwon | |
| 2011/0067942 A1 | 3/2011 | Takei | |
| 2012/0129066 A1 | 5/2012 | Ben-Aicha et al. | |
| 2018/0166711 A1* | 6/2018 | Kwon | H01M 8/04126 |
| 2019/0123406 A1* | 4/2019 | Yamamura | H01M 8/04074 |
| 2019/0312288 A1* | 10/2019 | Tsubouchi | H01M 8/04089 |

FOREIGN PATENT DOCUMENTS

| | | |
|---|---|---|
| CN | 210554237 | 5/2020 |
| DE | 10 2016 110964 | 12/2017 |
| JP | 2003-168462 | 6/2003 |
| JP | 2007-038950 | 2/2007 |
| JP | 2017199611 | 11/2017 |
| JP | 6455408 | 1/2019 |
| KR | 10-2018-0067255 | 6/2018 |
| KR | 20190064739 | 6/2019 |

OTHER PUBLICATIONS

Extended European Search Report dated Mar. 15, 2021, issued in European Patent Application No. 20198274.1.

* cited by examiner

*Primary Examiner* — James M Erwin
(74) *Attorney, Agent, or Firm* — H.C. Park & Associates, PLC

(57) ABSTRACT

A fuel cell system for a vehicle includes a first cooling line configured to pass through a fuel cell stack in a vehicle and configured to circulate a first coolant therein, a first cooler provided in the first cooling line and configured to cool the first coolant, and a second cooler provided in the first cooling line and configured to cool the first coolant independently from the first cooler, thereby obtaining an advantageous effect of ensuring a high output from the fuel cell stack and improving safety and reliability.

10 Claims, 3 Drawing Sheets

FUEL CELL SYSTEM FOR VEHICLE

CROSS-REFERENCE TO RELATED APPLICATION

This application claims priority to and the benefit of Korean Patent Application No. 10-2020-0073074 filed on Jun. 16, 2020, which is hereby incorporated by reference for all purposes as if set forth herein

BACKGROUND

Field

Exemplary embodiments relate to a fuel cell system for a vehicle, and more particularly, to a fuel cell system including a fuel cell stack for a vehicle, which is capable of ensuring a high output from the fuel cell stack and improving safety and reliability.

Discussion of the Background

A fuel cell system refers to a system that produces electrical energy by means of a chemical reaction of fuel. Research and development are consistently performed on the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like.

The fuel cell system includes a fuel cell stack configured to generate electrical energy, a fuel supply device configured to supply fuel (e.g., hydrogen) to the fuel cell stack, an air supply device configured to supply an oxidant (e.g., oxygen in air) required for an electrochemical reaction in the fuel cell stack, and a thermal management system (TMS) configured to remove reaction heat in the fuel cell stack out of the system, control the operating temperature of the fuel cell stack, and perform a function of managing water.

The thermal management system (TMS) refers to a kind of cooling device that maintains an appropriate temperature (e.g., 60 to 70° C.) by circulating an anti-freezing liquid, which serves as a coolant, to the fuel cell stack. The thermal management system may include a TMS line in which a coolant for cooling the fuel cell stack is circulated, a reservoir in which the coolant is stored, a pump configured to circulate the coolant, an ion filter configured to remove ions contained in the coolant, and a radiator configured to radiate heat of the coolant to the outside. In addition, the thermal management system may include a heater configured to heat the coolant, and an air conditioner (e.g., a HVAC unit) configured to cool and heat an interior of a vehicle by using the coolant.

Meanwhile, various attempts have recently been made to apply the fuel cell system to construction machines as well as passenger vehicles (or commercial vehicles).

Passenger vehicles require a high output from the fuel cell stack while traveling and may cool the fuel cell stack by the radiator using vehicle-induced wind generated in accordance with a vehicle speed.

In contrast, because construction machines performs work (e.g., leveling or loading) while stationary, a high output is required from the fuel cell stack while the construction machine is stationary. However, there is a problem in that it is difficult to sufficiently cool the fuel cell stack only with the amount of air flow generated by a cooling fan, which causes a deterioration in safety and durability of the fuel cell stack.

Therefore, recently, various types of research are being conducted into ways to effectively cool a fuel cell stack in a situation in which a high output is required from the fuel cell stack while a vehicle is stationary, but the research result is still insufficient. Accordingly, there is a need for development of a fuel cell system capable of effectively cooling the fuel cell stack in the above-mentioned situation.

The above information disclosed in this Background section is only for enhancement of understanding of the background of the invention and, therefore, it may contain information that does not constitute prior art.

SUMMARY

Exemplary embodiments of the present invention provide a fuel cell system for a vehicle, which is capable of ensuring a high output from a fuel cell stack and improving safety and reliability.

Another object of the present invention is to effectively cool a fuel cell stack and improve operating performance and operational efficiency of the fuel cell stack in a situation in which a high output is required from the fuel cell stack while a vehicle is stationary.

Still another object of the present invention is to minimize a deterioration in cooling performance which is caused by a decrease in flow rate of a coolant introduced into a fuel cell stack.

The object to be achieved by the exemplary embodiment is not limited to the above-mentioned objects, but also includes objects or effects that may be recognized from the solutions or the exemplary embodiments described below.

In order to achieve the above-mentioned objects of the present invention, a fuel cell system for a vehicle according to an exemplary embodiment includes a first cooling line configured to pass through a fuel cell stack in a vehicle and to circulate a first coolant therein, a first cooler provided in the first cooling line and configured to cool the first coolant, and a second cooler provided in the first cooling line and configured to cool the first coolant independently from the first cooler.

This is to ensure a high output from the fuel cell stack and improve safety and reliability.

For example, a passenger vehicle requires a high output from a fuel cell stack while traveling and may cool the fuel cell stack by a radiator using vehicle-induced wind generated in accordance with a vehicle speed. In contrast, because the construction machine performs work (e.g., leveling or loading) while the construction machine is stationary, a high output is required from the fuel cell stack while the construction machine is stationary. However, there is a problem in that it is difficult to sufficiently cool the fuel cell stack only with the amount of air flow generated by a cooling fan, which causes a deterioration in safety and durability of the fuel cell stack.

However, in the exemplary embodiment, the first coolant introduced into the fuel cell stack is cooled individually by the first cooler and the second cooler, such that it is possible to obtain an advantageous effect of ensuring a high output from the fuel cell stack and improving safety and reliability.

In particular, the exemplary embodiment may lower the temperature of the first coolant while a vehicle (e.g., a construction machine), which cannot use the vehicle-induced wind, is stationary, such that it is possible to obtain an advantageous effect of ensuring a high-output operation of the fuel cell stack and improving safety and durability.

Various cooling means capable of cooling the first coolant may be used as the first cooler.

As an example, the first cooler may include a first radiator provided in the first cooling line and configured to cool the first coolant.

Various cooling means capable of cooling the first coolant independently from the first cooler may be used as the second cooler.

As an example, the second cooler may include a first branch line branching off from the first cooling line, and a second radiator provided in the first branch line. The second radiator may be connected in parallel to the first radiator through the first branch line and configured to cool the first coolant.

In particular, one end of the first branch line may be connected to the first cooling line between an outlet of the fuel cell stack and an inlet of the first radiator, and the other end of the first branch line may be connected to the first cooling line between an outlet of the first radiator and an inlet of the fuel cell stack.

More particularly, a first on-off valve configured to selectively open or close the first branch line may be provided in the first branch line.

In a state in which the first on-off valve opens the first branch line, the first coolant may be cooled while passing through both the first radiator and the second radiator. In contrast, in a state in which the first on-off valve closes the first branch line, the first coolant passes only through the first radiator without passing through the second radiator, and as a result, the first coolant may be cooled only by the first radiator.

The fuel cell system for a vehicle according to the exemplary embodiment may include the first pump provided in the first cooling line and configured to pump the first coolant, and a flow rate adjuster provided in the first cooling line and configured to adjust a flow rate of the first coolant to be introduced into the fuel cell stack independently from the first pump.

This is to prevent the efficiency in cooling the fuel cell stack from being degraded due to a low flow rate of the first coolant. For example, in a case in which a flow rate of the first coolant is lower than a target flow rate (e.g., a predetermined flow rate) during the high-output operation of the fuel cell stack, there is a problem in that the efficiency in cooling the fuel cell stack deteriorates even though the temperature of the first coolant is within an appropriate temperature range.

However, according to the exemplary embodiments, since the flow rate adjuster configured to adjust a flow rate of the first coolant is provided in the first cooling line, it is possible to obtain an advantageous effect of minimizing a decrease in flow rate of the first coolant to be introduced into the fuel cell stack.

The flow rate adjuster may have various structures capable of adjusting a flow rate of the first coolant.

As an example, the flow rate adjuster may include a second branch line branching off from the first cooling line, and a second pump provided in the second branch line. The second pump may be connected in parallel to the first pump through the second branch line and configured to pump the first coolant.

In particular, one end of the second branch line may be connected to the first cooling line between the outlet of the first radiator and the first pump, and the other end of the second branch line may be connected to the first cooling line between the first pump and the inlet of the fuel cell stack.

More particularly, a second on-off valve configured to selectively open or close the second branch line may be provided in the second branch line.

In a state in which the second on-off valve opens the second branch line, the first coolant may be pumped by both the first pump and the second pump. In contrast, when the second on-off valve closes the second branch line, the first coolant may be pumped only by the first pump, and the first coolant pumped by the first pump may be prevented from being introduced into the second pump.

According to the exemplary embodiment, the fuel cell system may include a second cooling line configured to pass through a power electronic part of the vehicle and configured to circulate a second coolant therein, and a third radiator provided in the second cooling line and configured to cool the second coolant.

As an example, the power electronic part may include at least one of a bi-directional high-voltage DC-DC converter (BHDC) provided between the fuel cell stack and a high-voltage battery of the vehicle, a blower pump control unit (BPCU) configured to control a blower configured to supply outside air for operating the fuel cell stack, a low-voltage DC-DC converter (LDC) configured to convert a high direct-current voltage, which is supplied from the high-voltage battery, into a low direct-current voltage, an air compressor (ACP) configured to compress air to be supplied to the fuel cell stack, and an air cooler.

In particular, the first radiator and the third radiator may be disposed in parallel, and the fuel cell system may include a first cooling fan configured to blow outside air to the first radiator and the third radiator.

As described above, since the first radiator and the third radiator are simultaneously cooled by the same first cooling fan, it is possible to obtain an advantageous effect of simplifying the structure, improving a degree of design freedom and spatial utilization, and minimizing consumption of electric power required to cool the first radiator and the third radiator.

According to the exemplary embodiment, the fuel cell system may include a second cooling fan configured to blow outside air to the second radiator.

The fuel cell system for a vehicle according to the exemplary embodiment may include: a first connection line having one end connected to the first cooling line between an outlet of the first radiator and an inlet of the fuel cell stack, and the other end connected to the first cooling line between an outlet of the fuel cell stack and an inlet of the first radiator; a heater provided in the first connection line and configured to heat the first coolant flowing through the first connection line; and a second connection line configured to pass through an air conditioner in the vehicle, connected to the first cooling line between the outlet of the first radiator and the inlet of the fuel cell stack, and configured to circulate the first coolant therein.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
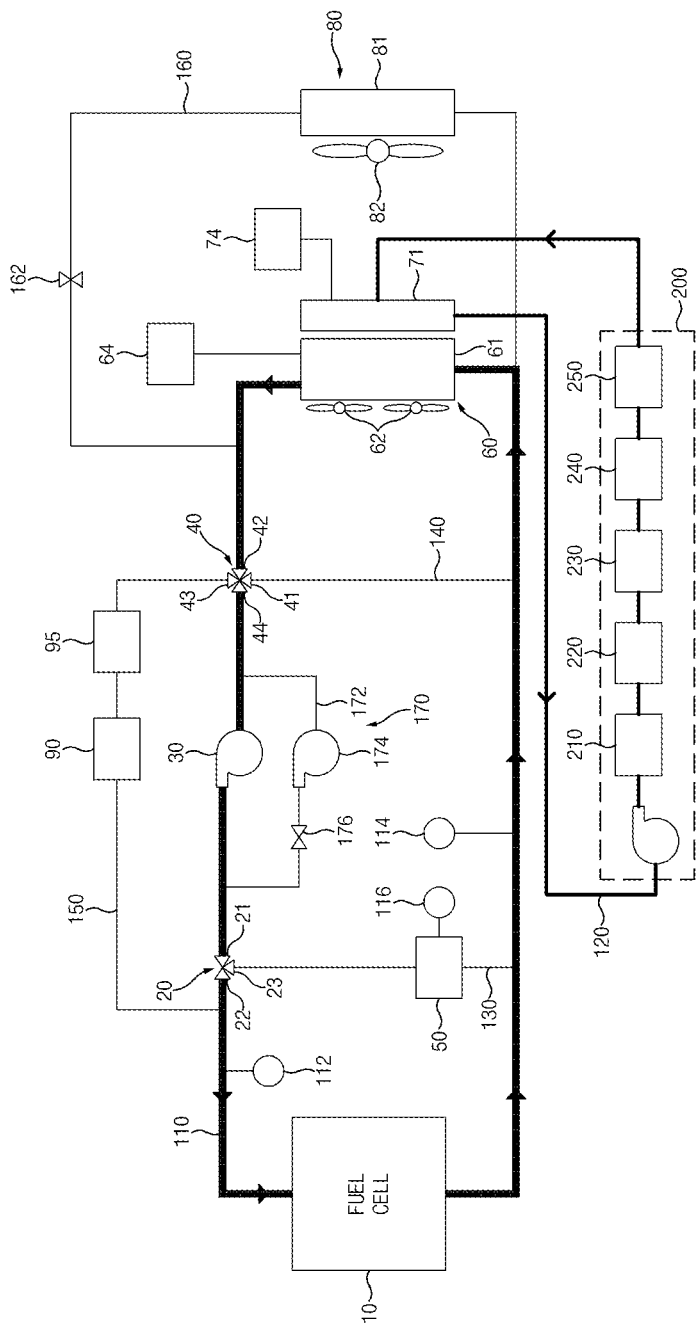
FIG. 1 is a schematic view of a fuel cell system for a vehicle according to an exemplary embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, exemplary embodiments will be described in detail with reference to the accompanying drawings.

However, the technical concepts of the present disclosure are not limited to some exemplary embodiments described herein but may be implemented in various different forms. One or more of the constituent elements in the exemplary embodiments may be selectively combined and substituted within the scope of the technical concepts of the present disclosure.

In addition, unless otherwise specifically and explicitly defined and stated, the terms (including technical and scientific terms) used in the exemplary embodiments may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary embodiments are for explaining the exemplary embodiments, not for limiting the exemplary embodiments.

Unless particularly stated otherwise in context of the following descriptions, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary embodiments.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Figure 2:
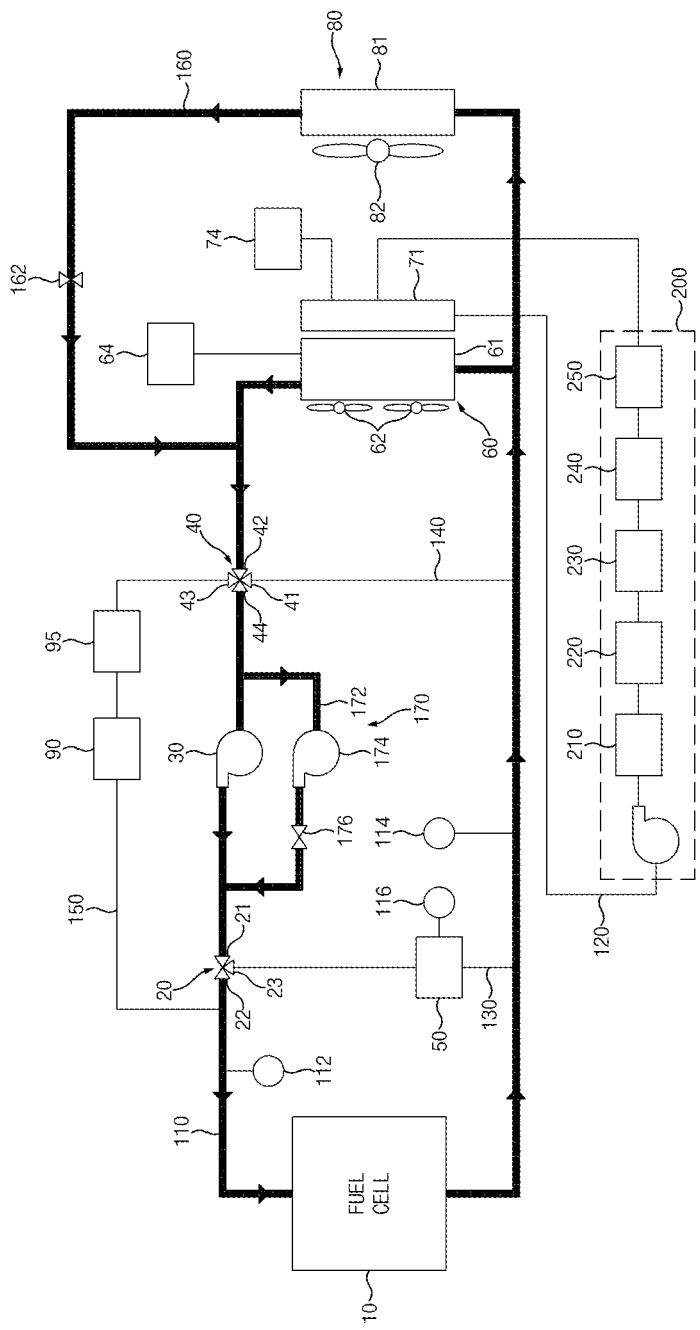
FIG. 2 is a schematic view for explaining a second cooler and a flow rate adjuster in the fuel cell system for the vehicle of FIG. 1.
Figure 3:
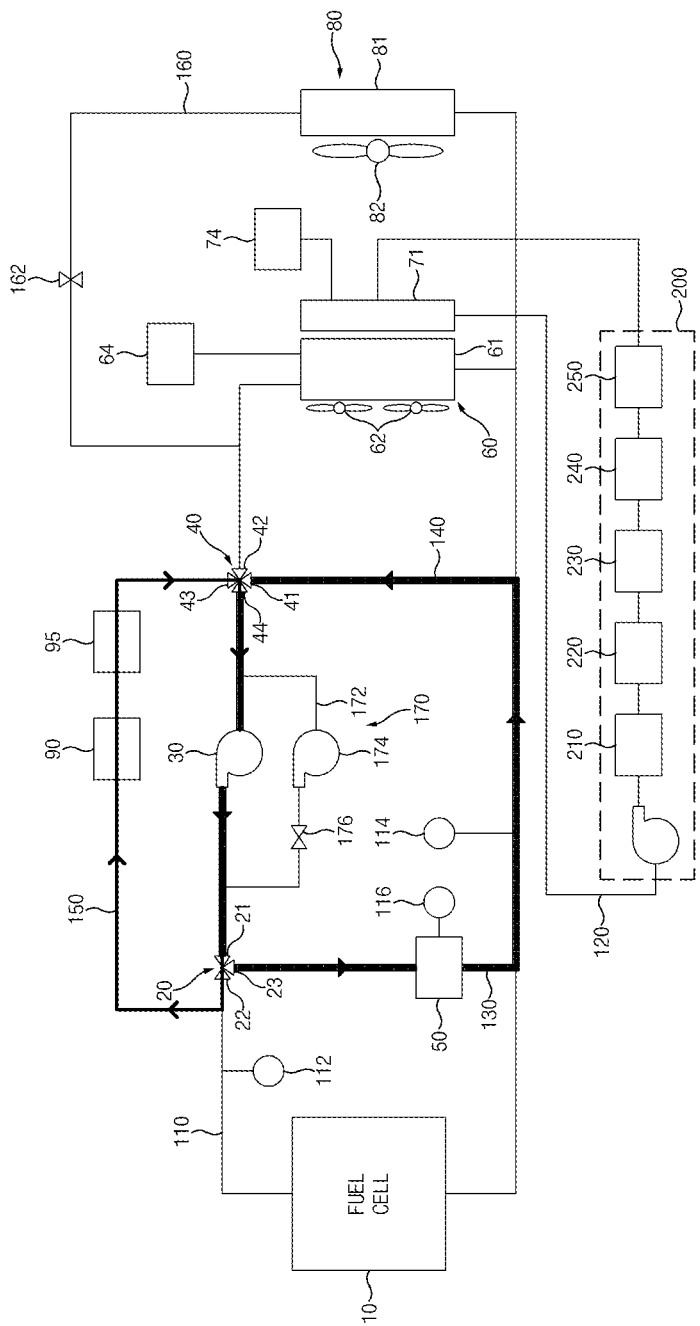
FIG. 3 is a schematic view for explaining a first connection line and a second connection line in the fuel cell system for the vehicle of FIG. 1.

Referring to FIGS. 1, 2, and 3, a fuel cell system for a vehicle according to an exemplary embodiment includes a first cooling line 110 configured to pass through a fuel cell stack 10 in a vehicle and allow a first coolant to circulate therein, a first cooler 60 connected to the first cooling line 110 and configured to cool the first coolant, and a second cooler 80 connected to the first cooling line 110 and configured to cool the first coolant independently from the first cooler 60.

For example, in the exemplary embodiment, the first cooling line 110 and a second cooling line 120 may form a thermal management system (TMS) line in which the coolant (e.g., the first coolant and a second coolant) may flow while performing heat exchange. The coolant may be used as a cooling medium or a heating medium in the TMS line.

The first cooling line 110 is configured to pass through the fuel cell stack 10, and the first coolant circulates along the first cooling line 110.

The first cooling line 110 is configured to define a cooling loop for cooling (i.e., decreasing the temperature of) the first coolant or a heating loop for heating (i.e., increasing the temperature of) the first coolant depending on a state of the vehicle. As an example, the first cooling line 110 may be configured to define the heating loop in order to ensure/guarantee a cold start ability in an initial start state, and define the cooling loop in order to discharge heat generated in the fuel cell stack 10 to the outside while the vehicle travels.

For example, the fuel cell stack 10 may have various structures capable of producing electricity by means of an oxidation-reduction reaction between fuel (e.g., hydrogen) and an oxidant (e.g., air).

As an example, the fuel cell stack 10 includes: a membrane electrode assembly (MEA) having catalyst electrode layers, in which electrochemical reactions occur, at both sides of an electrolyte membrane through which hydrogen ions move; a gas diffusion layer (GDL) configured to uniformly distribute reactant gases and serve to transfer generated electrical energy; a gasket and a fastener configured to maintain leakproof and sealability for the reactant gases and the first coolant and maintain an appropriate fastening pressure; and a separator (e.g., bipolar plate) configured to move the reactant gases and the first coolant.

More specifically, in the fuel cell stack 10, fuel (e.g., hydrogen) and an oxidant (e.g., air or oxygen) are supplied to an anode and a cathode of the membrane electrode assembly, respectively, through flow paths in the separator, such that the hydrogen as the fuel is supplied to the anode, and the air or oxygen as the oxidant is supplied to the cathode.

The hydrogen as the fuel supplied to the anode is decomposed into hydrogen ions (e.g., protons) and electrons by catalysts in the electrode layers provided at both sides of the electrolyte membrane. Only the hydrogen ions are selectively delivered to the cathode through the electrolyte membrane, and at the same time, the electrons are delivered to the cathode through the gas diffusion layer and the separator.

For example, the electrolyte membrane may be a positive ion exchange membrane, and the gas diffusion layer and the separator may be conductors.

At the cathode, the hydrogen ions supplied through the electrolyte membrane and the electrons delivered through the separator meet oxygen in the air supplied to the cathode by an air supply device to create a reaction of producing water. Due to the movement of the hydrogen ions, the electrons flow through external conductive wires, and an electric current is produced by the flow of the electrons.

The first cooler 60 for cooling the first coolant is provided in the first cooling line 110. For example, the first cooler 60 for cooling the first coolant is connected to the first cooling line 110 such that the first cooler 60 and the first cooling line 110 form the flowing path of the first coolant.

Various coolers capable of cooling the first coolant may be used as the first cooler 60, and the exemplary embodiments are not restricted or limited by the type and the structure of the first cooler 60.

As an example, the first cooler 60 may include a first radiator 61 connected to the first cooling line 110 and configured to cool the first coolant.

The first radiator 61 is connected to the first cooling line 110 in order to cool the first coolant, and the structure and the shape of the first radiator 61 may be variously changed in accordance with required conditions and design specifications.

Further, the first radiator 61 is connected to a first reservoir 64 configured to store the first coolant.

In addition, a first pump 30 configured to force the first coolant to flow is provided in the first cooling line 110. For example, the first pump 30 is connected to the first cooling line 110 to form the flowing path of the first coolant.

Various pumps capable of pumping the first coolant may be used as the first pump 30, and the exemplary embodiments are not restricted or limited by the type and the property of the first pump 30.

Referring to FIGS. 1 and 2, the second cooler 80 is provided in the first cooling line 110 in order to cool the first coolant independently from the first cooler 60.

Various coolers capable of cooling the first coolant may be used as the second cooler 80, and the exemplary embodiments are not restricted or limited by the type and the structure of the second cooler 80.

As an example, the second cooler 80 includes a first branch line 160 branching off from the first cooling line 110, and a second radiator 81 provided in the first branch line 160. For example, the second radiator 81 is be connected in parallel to the first radiator 61 and configured to cool the first coolant independently from the first radiator 61.

More specifically, one end of the first branch line 160 is connected to a first portion of the first cooling line 110 between an outlet of the fuel cell stack 10 and an inlet of the first radiator 61, and the other end of the first branch line 160 is connected to a second portion of the first cooling line 110 between an outlet of the first radiator 61 and an inlet of the fuel cell stack 10.

In particular, the second radiator 81 is configured to be cooled by a second cooling fan 82 that blows outside air.

As described above, in the exemplary embodiment, the first coolant introduced into the fuel cell stack 10 is cooled individually by the first cooler 60 and the second cooler 80, such that it is possible to obtain an advantageous effect of ensuring a high output from the fuel cell stack 10 and improving safety and reliability.

In particular, according to the exemplary embodiment, it is possible to lower the temperature of the first coolant by using the first cooler 60 and the second cooler 80 while a vehicle (e.g., a construction machine), which cannot use the vehicle-induced wind, is stationary, thereby obtaining an advantageous effect of ensuring a high-output operation of the fuel cell stack 10 and improving safety and durability.

In particular, a first on-off valve 162 configured to selectively open or close the first branch line 160 may be provided in the first branch line 160.

For example, the first on-off valve 162 is provided between the other end of the first branch line 160 (e.g., the second portion of the first cooling line 110 between the outlet of the first radiator 61 and the inlet of the fuel cell stack 10) and an outlet of the second radiator 81 in order to selectively open or close the first branch line 160.

Various valves capable of selectively opening or closing the first branch line 160 may be used as the first on-off valve 162, and the exemplary embodiments are not restricted or limited by the type and the structure of the first on-off valve 162.

As an example, a typical two-way valve may be used as the first on-off valve 162.

In a state in which the first on-off valve 162 opens the first branch line 160, the first coolant may be cooled while passing through both the first radiator 61 and the second radiator 81. In contrast, in a state in which the first on-off valve 162 closes the first branch line 160, the first coolant passes only through the first radiator 61 without passing through the second radiator 81, and as a result, the first coolant may be cooled only by the first radiator 61.

For example, in a situation in which a large amount of heat needs to be radiated/discharged from the fuel cell stack 10 (e.g., during a high-output operation of the fuel cell stack 10 while the vehicle is stationary), the first on-off valve 162 is opened, and thus the first coolant may be cooled by both the first radiator 61 and the second radiator 81, such that the first coolant may be cooled more quickly and effectively. In contrast, during a low-output operation of the fuel cell stack 10, the first on-off valve 162 is closed, and thus the first coolant may be cooled only by the first radiator 61.

The fuel cell system for a vehicle according to the exemplary embodiment may include the first pump 30 provided in the first cooling line 110 and configured to pump the first coolant, and a flow rate adjuster 170 provided in the first cooling line 110 and configured to adjust a flow rate of the first coolant to be introduced into the fuel cell stack 10 independently from the first pump 30. For example, the flow rate adjuster 170 is connected in parallel to the first pump 30.

This is to prevent the efficiency in cooling the fuel cell stack 10 from being degraded due to an insufficient flow rate of the first coolant.

For example, in a case in which a flow rate of the first coolant is lower than a target flow rate (a predetermined flow rate) during the high-output operation of the fuel cell stack 10, there is a problem in that the efficiency in cooling the fuel cell stack 10 is degraded even though a temperature of the first coolant is within an appropriate temperature range.

However, according to the exemplary embodiments, since the flow rate adjuster 170 configured to adjust a flow rate of the first coolant is provided in the first cooling line 110, it is possible to obtain an advantageous effect of minimizing a decrease in flow rate of the first coolant to be introduced into the fuel cell stack 10.

The flow rate adjuster 170 may have various structures capable of adjusting a flow rate of the first coolant, and the exemplary embodiments are not restricted or limited by the structure of the flow rate adjuster 170.

As an example, the flow rate adjuster 170 may include a second branch line 172 branching off from the first cooling line 110, and a second pump 174 provided in the second branch line 172. For example, the second pump 174 is connected in parallel to the first pump 30 through the second branch line 172 and configured to pump the first coolant.

In particular, one end of the second branch line 172 is connected to a portion of the first cooling line 110 between the outlet of the first radiator 61 and the first pump 30, and the other end of the second branch line 172 is connected to a portion of the first cooling line 110 between the first pump 30 and the inlet of the fuel cell stack 10.

The second pump 174 is configured to force the first coolant to flow through the second branch line 172.

Various pumps capable of pumping the first coolant may be used as the second pump 174, and the exemplary embodiments are not restricted or limited by the type and the property of the second pump 174.

In particular, a second on-off valve 176 configured to selectively open or close the second branch line 172 may be provided in the second branch line 172.

For example, the second on-off valve 176 is provided between the other end of the second branch line 172 and the second pump 174 in order to selectively open or close the second branch line 172.

Various valves capable of selectively opening or closing the second branch line 172 may be used as the second on-off valve 176, and the exemplary embodiments are not restricted or limited by the type and the structure of the second on-off valve 176.

As an example, a typical two-way valve may be used as the second on-off valve 176.

In a state in which the second on-off valve 176 opens the second branch line 172, the first coolant may be pumped by both the first pump 30 and the second pump 174. In contrast, when the second on-off valve 176 closes the second branch line 172, the first coolant may be pumped only by the first pump 30, and the first coolant pumped by the first pump 30 may be prevented from being introduced into the second pump 174.

For example, in a situation in which a large amount of heat needs to be radiated/discharged from the fuel cell stack 10 (e.g., during a high-output operation of the fuel cell stack 10 while the vehicle is stationary), the second on-off valve 176 is opened, and thus the first coolant may be pumped by both the first pump 30 and the second pump 174, such that a sufficient flow rate of the first coolant may be ensured/guaranteed. In contrast, during a low-output operation of the fuel cell stack 10, the second on-off valve 176 is closed, and thus the first coolant may be pumped only by the first pump 30.

Referring to FIGS. 1 and 3, the fuel cell system according to the exemplary embodiment may include a first connection line 130, and the first connection line 130 may define a heating loop (e.g., a heating circulation route) for heating the first coolant in cooperation with the first cooling line 110.

More specifically, one end of the first connection line 130 is connected to the first cooling line 110 at a first point positioned between an outlet of the first pump 30 and the fuel cell stack 10, and the other end of the first connection line 130 is connected to the first cooling line 110 at a second point positioned between an inlet of the first pump 30 and the fuel cell stack 10.

In this case, the inlet of the first pump 30 is defined as an inlet through which the first coolant is introduced into the first pump 30. In addition, the outlet of the first pump 30 is defined as an outlet through which the first coolant having passed through the first pump 30 is discharged.

Further, the first cooling line 110 between the outlet of the first pump 30 and the fuel cell stack 10 is defined as a section in which the first coolant discharged from the first pump 30 flows to a first coolant inlet port of the fuel cell stack 10. In addition, the first cooling line 110 between the inlet of the first pump 30 and the fuel cell stack 10 is defined as a section in which the first coolant discharged from a coolant discharge port of the fuel cell stack 10 flows to the inlet of the first pump 30.

According to the exemplary embodiment, a heater 50 may be connected to the first connection line 130, and the first coolant flowing along the first connection line 130 may be heated while passing through the heater 50.

In addition, a first valve 20 configured to switch a flow path of the first coolant to the heater 50 or the fuel cell stack 10 is provided in the first cooling line 110.

As an example, the first valve 20 is provided in the first cooling line 110 so as to be positioned at the first point, and one end of the first connection line 130 is connected to the first valve 20.

Various valves capable of selectively switching the flow path of the first coolant to the heater 50 or the fuel cell stack 10 may be used as the first valve 20.

As an example, a typical three-way valve may be used as the first valve 20. More specifically, the first valve 20 includes a first port 21 connected to the first cooling line 110 so that the first coolant pumped by the first pump 30 is introduced into the first valve 20, a second port 22 connected to the first cooling line 110 so that the first coolant passing through the first valve 20 is introduced into the fuel cell stack 10, and a third port 23 connected to one end of the first connection line 130.

It is possible to selectively switch the flow path of the first coolant to the heater 50 or the fuel cell stack 10 by opening and closing the second port 22 and the third port 23 of the first valve 20. For example, when the second port 22 is opened and the third port 23 is closed, the first coolant passing through the first valve 20 is introduced into the fuel cell stack 10. On the contrary, when the third port 23 is opened and the second port 22 is closed, the first coolant passing through the first valve 20 is introduced into the heater 50 through the first connection line 130.

The fuel cell system according to the exemplary embodiment may include a second connection line 150 connected to the first cooling line 110 and configured to define a cooling/heating loop for cooling and heating an air conditioner (e.g., HVAC) 90 in cooperation with the first cooling line 110.

As an example, the second connection line 150 may define a loop for heating a heater of the air conditioner 90.

More specifically, the second connection line 150 is connected to the first cooling line 110 between the first point (e.g., at which one end of the first connection line 130 is connected to the first cooling line 110) and the outlet of the fuel cell stack 10, and the second connection line 150 is configured to allow a part of the first coolant to circulate therein.

In this case, the first cooling line 110 between the first point and the outlet of the fuel cell stack 10 is defined as a section in which the first coolant discharged from the coolant discharge port of the fuel cell stack 10 flows before passing through the first point.

As an example, one end of the second connection line 150 is connected to the first cooling line 110 between the first point and the inlet of the fuel cell stack 10, and the other end of the second connection line 150 is connected to the first cooling line 110 between the first pump 30 and the second point.

In addition, the second connection line 150 may be provided with an ion filter 95 configured to filter out ions contained in the first coolant that has passed through the air conditioner 90.

For example, when electrical conductivity of the first coolant is increased due to corrosion, exudation, or the like of the system, electricity flows to the first coolant, which causes a problem in that the fuel cell stack 10 is short-circuited or electric current flows toward the first coolant. Therefore, low electrical conductivity of the first coolant needs to be maintained.

The ion filter 95 is configured to remove the ions contained in the first coolant in order to reduce the electrical conductivity of the first coolant to a predetermined level or lower.

As described above, according to the exemplary embodiments, the first coolant also circulates along the second connection line 150 while circulating (e.g., along the heating loop) via the heater 50 in the first connection line 130 during the cold start in which the supply of the first coolant to the fuel cell stack 10 is cut off (e.g., the second port of the first valve is closed), and as a result, the ion filter 95 provided in the second connection line 150 may filter out (or remove) the ions contained in the first coolant even during the cold start. Therefore, it is possible to obtain an advantageous effect of reducing the electrical conductivity of the first coolant, which is introduced into the fuel cell stack 10 immediately after the cold start, to a predetermined level or lower.

In addition, in the exemplary embodiment, the first cooling line 110 is configured to pass through the first radiator 61 between the first pump 30 and the outlet of the fuel cell stack 10, and the fuel cell system may include a third connection line 140 having one end connected to the first cooling line 110 at a front side of the first radiator 61, and the other end connected to the first cooling line 110 at a rear side of the first radiator 61.

Referring to FIGS. 1 and 3, the third connection line 140 is connected to the first cooling line 110 and provided to define a cooling loop for cooling the first coolant in cooperation with the first cooling line 110. As an example, one end of the third connection line 140 may be connected to the first cooling line 110 between the first pump 30 and the first radiator 61, and the other end of the third connection line 140 may be connected to the first cooling line 110 between the coolant discharge port of the fuel cell stack 10 and the first radiator 61.

In addition, a second valve 40 configured to switch a flow path of the first coolant to the first radiator 61 or the fuel cell stack 10 is provided in the first cooling line 110.

As an example, the second valve 40 is provided in the first cooling line 110 so as to be positioned between the first pump 30 and the first radiator 61, and the second valve 40 is connected to one end of the third connection line 140 and an outlet end (e.g., the other end) of the second connection line 150.

Various valves capable of selectively switching the flow path of the first coolant to the first radiator 61 or the fuel cell stack 10 may be used as the second valve 40.

As an example, a typical four-way valve may be used as the second valve 40. More specifically, the second valve 40 includes a first port 41 connected to the third connection line 140, a second port 42 connected to the first cooling line 110, a third port 43 connected to the other end of the second connection line 150, and a fourth port 44 connected to the first cooling line 110. For example, the first coolant passing through the first radiator 61 is introduced into the second valve 40 through the second port 42. The first coolant passing through the second valve 40 is introduced into the first pump 30 through the fourth port 44.

It is possible to selectively switch the flow path of the first coolant to the first radiator 61 or the fuel cell stack 10 by opening and closing the first port 41 and the second port 42 of the second valve 40. For example, when the first port 41 is opened and the second port 42 is closed, the first coolant is introduced into the fuel cell stack 10 without passing through the first radiator 61. On the contrary, when the second port 42 is opened and the first port 41 is closed, the first coolant passes through the first radiator 61 and then enters the fuel cell stack 10.

Meanwhile, the fuel cell system according to the exemplary embodiment may include a first temperature sensor 112 configured to measure the temperature of the first coolant between the fuel cell stack 10 and the first point (e.g., the first valve), a second temperature sensor 114 configured to measure the temperature of the first coolant between the other end of the first connection line 130 and the first pump 30, and a third temperature sensor 116 configured to measure the temperature of the first coolant in the heater 50. An inflow rate of the first coolant to be introduced into the fuel cell stack 10 may be controlled based on the temperatures measured by the first temperature sensor 112, the second temperature sensor 114, and the third temperature sensor 116.

As an example, when a measured temperature of the first coolant circulating along the first cooling line 110 is lower than a predetermined target temperature, an inflow rate of the first coolant may be controlled to be lower than a predetermined flow rate. As described above, since the inflow rate of the first coolant to be introduced into the fuel cell stack 10 is controlled to be lower than the predetermined flow rate when the measured temperature of the first coolant is lower than the predetermined target temperature, it is possible to obtain an advantageous effect of minimizing a thermal shock and a degradation in performance caused by a deviation in temperature of the first coolant (e.g., the difference between the temperature of the first coolant stagnating in the fuel cell stack 10 and the temperature of the first coolant to be introduced into the fuel cell stack 10).

The fuel cell system according to the exemplary embodiment may include the second cooling line 120 configured to pass through power electronic parts 200 of the vehicle, and the second coolant may circulate along the second cooling line 120.

In this case, the power electronic parts 200 of the vehicle may be understood as components that use electric power of the vehicle as an energy source, and the exemplary embodiments are not restricted or limited by the type and the number of power electronic parts 200 of the vehicle.

As an example, the power electronic part 200 may include at least one of a bi-directional high-voltage DC-DC converter (BHDC) 210 provided between the fuel cell stack 10 and a high-voltage battery of the vehicle, a blower pump control unit (BPCU) 220 configured to control a blower configured to supply outside air for operating the fuel cell stack 10, a low-voltage DC-DC converter (LDC) 230 configured to convert a high direct-current voltage (which is supplied from the high-voltage battery) into a low direct-current voltage, an air compressor (ACP) 240 configured to compress air to be supplied to the fuel cell stack 10, and an air cooler 250.

A third pump configured to force the second coolant to flow is provided in the second cooling line 120.

Various pumps capable of pumping the second coolant may be used as the third pump, and the exemplary embodiments are not restricted or limited by the type and the property of the third pump.

In addition, a third radiator 71 configured to cool the second coolant may be provided in the second cooling line 120.

The third radiator 71 may have various structures capable of cooling the second coolant, and the exemplary embodiments are not restricted or limited by the type and the structure of the third radiator 71.

Further, the third radiator 71 may be connected to a second reservoir 74 configured to store the second coolant.

In particular, the first radiator 61 and the third radiator 71 are configured to be simultaneously cooled by the same first cooling fan 62. As an example, the first radiator 61 and the third radiator 71 are disposed in parallel, and the first cooling fan 62 is provided to blow outside air to the first radiator 61 and the third radiator 71.

As described above, since the first radiator 61 and the third radiator 71 are simultaneously cooled by the same first cooling fan 62, it is possible to obtain an advantageous effect of simplifying the structure, improving a degree of design freedom and spatial utilization, and minimizing consumption of electric power required to cool the first radiator 61 and the third radiator 71.

According to the exemplary embodiment as described above, it is possible to obtain an advantageous effect of ensuring a high output from the fuel cell stack and improving safety and reliability.

In particular, according to the exemplary embodiment, it is possible to obtain an advantageous effect of effectively cooling the fuel cell stack and improving operating performance and operational efficiency of the fuel cell stack in the situation in which a high output is required from the fuel cell stack while the vehicle is stationary.

In addition, according to the exemplary embodiment, it is possible to obtain an advantageous effect of minimizing a decrease in flow rate of the coolant to be introduced into the fuel cell stack and preventing a degradation in cooling performance of the fuel cell stack.

While the exemplary embodiments have been described above, the exemplary embodiments are just illustrative and not intended to limit the present disclosure. It can be appreciated by those skilled in the art that various modifications and alterations, which are not described above, may be made to the illustrated exemplary embodiment without departing from the intrinsic features of the illustrated exemplary embodiments. For example, the respective constituent elements specifically described in the exemplary embodiments may be modified and then carried out. Further, it should be interpreted that the differences related to the modifications and alterations are included in the scope of the exemplary embodiments defined by the appended claims.

What is claimed is:

1. A fuel cell system for a vehicle, the fuel cell system comprising:
    a first cooling line configured to pass through a fuel cell stack in a vehicle and to circulate a first coolant therein;
    a first cooler provided in the first cooling line and configured to cool the first coolant;
    a second cooler provided in the first cooling line and configured to cool the first coolant independently from the first cooler;
    a first pump provided in the first cooling line and configured to pump the first coolant; and
    a flow rate adjuster provided in the first cooling line and configured to adjust a flow rate of the first coolant to be introduced into the fuel cell stack independently from the first pump,
    wherein the first cooler comprises a first radiator connected to the first cooling line and configured to cool the first coolant, and the second cooler comprises a first branch line which branches off from the first cooling line, and a second radiator connected to the first branch line, the second radiator connected in parallel to the first radiator through the first branch line and configured to cool the first coolant,
    wherein the flow rate adjuster comprises:
    a second branch line branching off from the first cooling line; and
    a second pump provided in the second branch line, the second pump connected in parallel to the first pump through the second branch line and configured to pump the first coolant.

2. The fuel cell system of claim 1, wherein a first end of the first branch line is connected to a first portion of the first cooling line between an outlet of the fuel cell stack and an inlet of the first radiator, and a second end of the first branch line is connected to a second portion of the first cooling line between an outlet of the first radiator and an inlet of the fuel cell stack.

3. The fuel cell system of claim 2, further comprising:
    a first on-off valve configured to selectively open or close the first branch line and disposed between the second end of the first branch line and an outlet of the second radiator.

4. The fuel cell system of claim 1, wherein a first end of the second branch line is connected to a first portion of the first cooling line between an outlet of the first radiator and the first pump, and a second end of the second branch line is connected to a second portion of the first cooling line between the first pump and an inlet of the fuel cell stack.

5. The fuel cell system of claim 4, further comprising:
    a second on-off valve configured to selectively open or close the second branch line and disposed between the second end of the second branch line and the second pump.

6. A fuel cell system for a vehicle, the fuel cell system comprising:
    a first cooling line configured to pass through a fuel cell stack in a vehicle and to circulate a first coolant therein;
    a first cooler provided in the first cooling line and configured to cool the first coolant;
    a second cooler provided in the first cooling line and configured to cool the first coolant independently from the first cooler;
    a second cooling line configured to pass through a power electronic circuit of the vehicle and configured to allow a second coolant to circulate therein; and
    a third radiator provided in the second cooling line and configured to cool the second coolant,
    wherein the first cooler comprises a first radiator connected to the first cooling line and configured to cool the first coolant, and the second cooler comprises a first branch line which branches off from the first cooling line, and a second radiator connected to the first branch line, the second radiator connected in parallel to the first radiator through the first branch line and configured to cool the first coolant.

7. The fuel cell system of claim 6, wherein the power electronic circuit comprises at least one of a bi-directional high-voltage DC-DC converter (BHDC) provided between the fuel cell stack and a high-voltage battery of the vehicle, a blower pump controller (BPCU) configured to control a blower configured to supply outside air for operating the fuel cell stack, a low-voltage DC-DC converter (LDC) configured to convert a high direct-current voltage, which is supplied from the high-voltage battery, into a low direct-current voltage, an air compressor (ACP) configured to compress air to be supplied to the fuel cell stack, and an air cooler.

8. The fuel cell system of claim 6, wherein the first radiator and the third radiator are disposed in parallel, and the fuel cell system further comprises a first cooling fan configured to blow outside air to the first radiator and the third radiator.

9. The fuel cell system of claim 1, further comprising:
a second cooling fan configured to blow outside air to the second radiator.

10. A fuel cell system for a vehicle, the fuel cell system comprising:
a first cooling line configured to pass through a fuel cell stack in a vehicle and to circulate a first coolant therein;
a first cooler provided in the first cooling line and configured to cool the first coolant;
a second cooler provided in the first cooling line and configured to cool the first coolant independently from the first cooler;
a first connection line having a first end connected to the first cooling line between an outlet of the first radiator and an inlet of the fuel cell stack, and a second end connected to the first cooling line between an outlet of the fuel cell stack and an inlet of the first radiator;
a heater provided in the first connection line and configured to heat the first coolant flowing through the first connection line; and
a second connection line configured to pass through an air conditioner in the vehicle, connected to the first cooling line between the outlet of the first radiator and the inlet of the fuel cell stack, and configured to circulate the first coolant therein,
wherein the first cooler comprises a first radiator connected to the first cooling line and configured to cool the first coolant, and the second cooler comprises a first branch line which branches off from the first cooling line, and a second radiator connected to the first branch line, the second radiator connected in parallel to the first radiator through the first branch line and configured to cool the first coolant.

* * * * *